(12) United States Patent
Dickie et al.

(10) Patent No.: US 6,205,956 B1
(45) Date of Patent: Mar. 27, 2001

(54) COLLAR AND LEASH ASSEMBLY

(76) Inventors: Robert G. Dickie, 15 Valley Trail, Newmarket, Ontario; Joyanne Plaxton; Timothy G. Fernandes, both of 1053 Bathurst Street, Toronto, Ontario, all of (CA)

( * ) Notice: Subject to any disclaimer, the term of this patent is extended or adjusted under 35 U.S.C. 154(b) by 0 days.

(21) Appl. No.: 09/372,989

(22) Filed: Aug. 12, 1999

(51) Int. Cl.⁷ .................................................. A01K 27/00
(52) U.S. Cl. ........................... 119/792; 119/776; 119/863
(58) Field of Search ..................................... 119/772, 776, 119/865, 792, 793, 863; 70/18, 49, 58

(56) References Cited

U.S. PATENT DOCUMENTS

| | | | |
|---|---|---|---|
| 3,505,979 | * 4/1970 | Rosswag | 119/772 |
| 3,752,127 | * 8/1973 | Baker | 119/797 |
| 3,867,905 | * 2/1975 | Vail, Jr. | 119/793 |
| 4,398,500 | * 8/1983 | Koronkiewicz | 119/793 |
| 4,621,589 | * 11/1986 | Thinnes | 119/770 |
| 4,907,541 | * 3/1990 | Thompson | 119/771 |
| 4,932,362 | * 6/1990 | Birchmire, III et al. | 119/772 |
| 4,964,370 | * 10/1990 | Peterson | 119/794 |
| 5,117,663 | * 6/1992 | Ida | 70/64 |
| 5,197,413 | * 3/1993 | Gyr | 119/858 |
| 5,317,989 | * 6/1994 | Swanson et al. | 119/792 |
| 5,322,037 | * 6/1994 | Tozawa | 119/865 |
| 5,505,162 | 4/1996 | Fleischer et al. | |
| 5,517,836 | * 5/1996 | Hong | 70/30 |
| 5,701,849 | * 12/1997 | Suchowski et al. | 119/865 |
| 5,893,339 | * 4/1999 | Liu | 119/792 |
| 6,095,094 | * 8/2000 | Phillips | 119/792 |

FOREIGN PATENT DOCUMENTS

| | | |
|---|---|---|
| 2809565 | * 3/1978 | (DE) . |
| 2846087 | * 5/1980 | (DE) ................................... 119/776 |

* cited by examiner

*Primary Examiner*—Peter M. Poon
*Assistant Examiner*—Son T. Nguyen
(74) *Attorney, Agent, or Firm*—Sterne, Kessler, Goldstein & Fox P.L.L.C.

(57) ABSTRACT

A collar and leash assembly for securing an animal, including a collar, a leash, and a locking mechanism. The locking mechanism is connected to the collar and to a first end of the leash. A catch located on the second end of the leash is attached to the locking mechanism, forming a loop around a secure object. The catch cannot be released from the locking mechanism unless the locking mechanism is unlocked. This collar and leash assembly provides an effective means of securing an animal.

15 Claims, 6 Drawing Sheets

COLLAR AND LEASH ASSEMBLY

BACKGROUND OF THE INVENTION

1. Field of the Invention

The present invention relates to a collar and leash assembly for securing an animal. In particular, the present invention relates to a collar and leash assembly capable of locking an animal about a secure object.

2. Related Art

Prior leash and collar devices presented many problems for pet owners. Many establishments, such as supermarkets and restaurants, do not allow animals inside buildings. Often, a pet owner must leave their pet outside such establishments. In order to keep pets from escaping, pet owners often use a collar and leash assembly to attach their pet to a secure object. Prior collar and leash devices can be tied or latched to a secure object. Although these prior devices can successfully restrain animals, these devices often facilitate the stealing of pets. Thieves can easily untie such prior collar and leash devices with minimal effort. A pet could be stolen within a matter of seconds. Simply latching a pet to a post does not prevent stealing of a pet. Thus, a collar and leash assembly that could attach a pet to a secure object without the risk of being easily stolen is needed.

SUMMARY OF THE INVENTION

The present invention relates to a collar and leash assembly capable of locking an animal to a secure object. In particular, one end of a leash is locked or permanently attached to a collar and a locking mechanism, while the second end of a leash is locked to the locking mechanism. When both ends of the leash are attached to the locking mechanism and collar, the leash forms a loop around a secure object, locking the animal to the object. Further, the leash cannot be locked or unlocked without the proper combination, key, or other unlocking mechanism.

The collar and leash assembly of the present invention has many advantages over prior leash and collar devices. First, the device is simple, lightweight, and user-friendly. The collar has a familiar seat-belt mechanism that can easily be latched and unlatched. The assembly has a compact design so that it is not cumbersome when worn by a pet. It is also easy to carry and store.

Further, the collar and leash assembly is durable and safe. The leash is made of a durable material so that it will not break easily and cannot be easily cut. The leash and collar are both covered with safe materials that will not snag or catch in an animal's fur.

Finally, the locking mechanism is simple yet effective. It uses a tumbler lock, which is easy to manipulate. The assembly cannot be locked unless a user knows the correct combination to the lock. This assembly prevents the collar from being accidently locked. With the proper combination, the collar and leash assembly is quickly and easily locked and unlocked.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
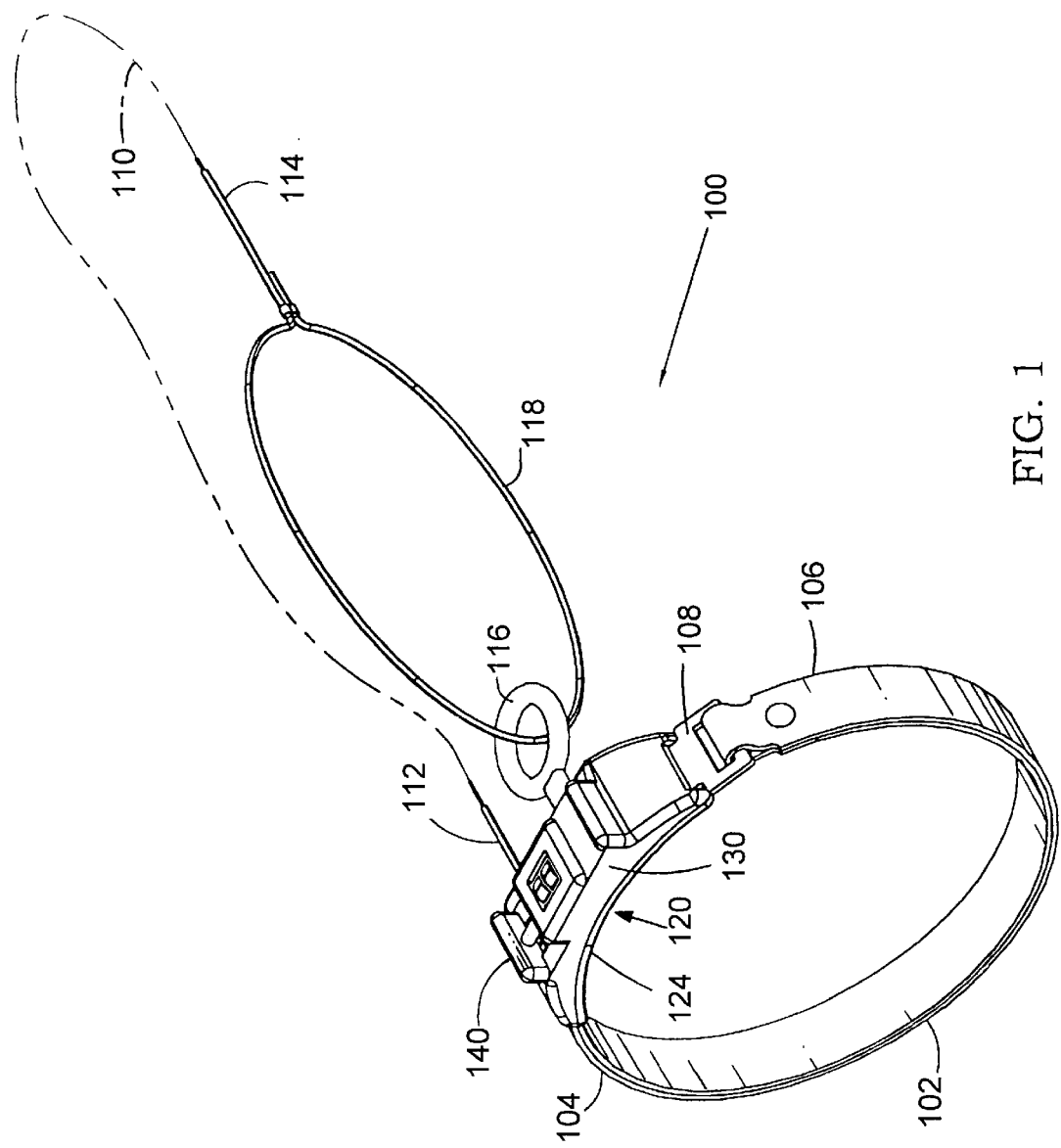
FIG. 1 is a perspective view of the collar and leash assembly of the present invention having a locking mechanism with a face plate and a release switch.

FIG. 1 shows a perspective view of the collar and leash assembly 100 of the present invention. Collar and leash assembly 100 includes a collar 102, a leash 110, and a locking mechanism 120. Locking mechanism 120 has a face plate 130, a back plate 124, and a release switch 140. In the preferred embodiment, locking mechanism 120 is of metal die cast construction, although it would be apparent to one skilled in the relevant art that high impact plastic or other similar materials could be used to construct locking mechanism 120.

Figure 2:
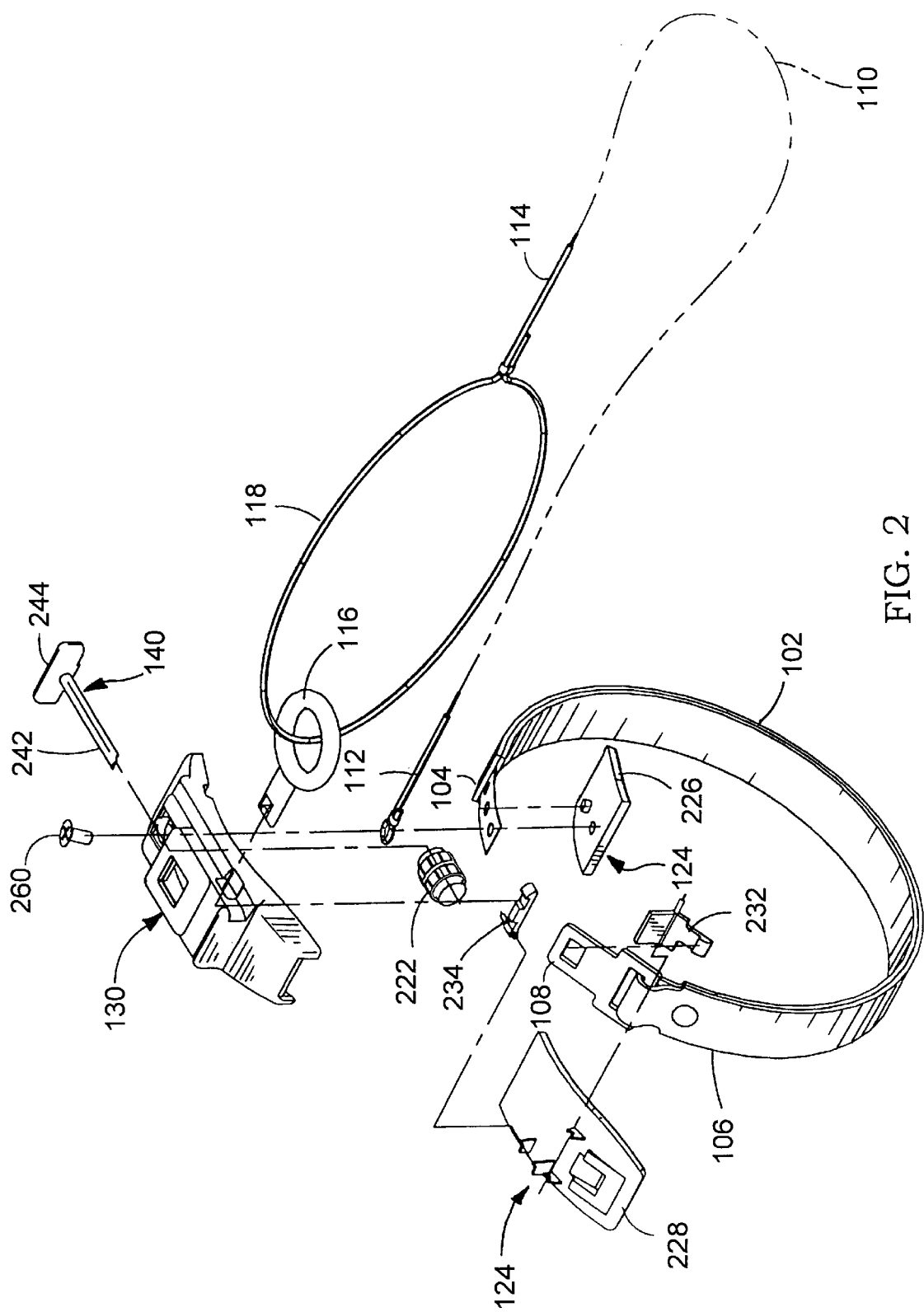
FIG. 2 is an exploded view of the collar and leash assembly of FIG. 1.

Leash 110 has a first end 112 and a second end 114. In one embodiment, a catch 116 is located at second end 114 of leash 110. In FIG. 1, catch 116 is shown as a key, although any other similar type of catch could be used, as would be apparent to one skilled in the relevant art. Further, as shown in FIG. 1, a handle 118 is located on second end 114 of leash 110, with catch 116 disposed on handle 118. Handle 118 is shown as a loop formed of second end 114 of leash 110. However, handle 118 could also be a straight handle, textured grip, or other similar gripping mechanism as would be apparent to one skilled in the relevant art. First end 112 of leash 110 is shown in FIGS. 1 and 2 as being permanently affixed to collar 102. However, in another embodiment, first end 112 could be removably attached to locking mechanism 120 so that the leash could be removed entirely from the collar.

In one embodiment, leash 110 is a stainless steel cable, such as a highly flexible steel braid. However, leash 110 may be made of any other similar materials that are resistant to tampering, such as cutting, as would be apparent to one skilled in the relevant art. Leash 110 can be covered with leather, nylon or other encapsulation material to give finish to the product and prevent the cable or other tamper-resistant material from snagging fur or clothing.

Collar 102 has a first end 104 and a second end 106. First end 104 of collar 102 is preferably permanently secured to locking mechanism 120. A buckle 108 is secured to second end 106 of collar 102. In one embodiment, collar 102 has pre-punched holes (shown in FIG. 2) for sizing. However, collar 102 could also be pre-sized to fit a particular dog. Collar 102 is preferably made of a steel inner band (not visible in FIG. 1) covered with leather or nylon. As would be apparent to one skilled in the relevant art, other tamper-resistant materials could also be used for the inner band of collar 102. Further, other similar materials could be used for the covering for collar 102.

FIG. 2 shows an exploded view of the collar and leash assembly 100 of the present invention. Locking mechanism 120 will now be described in more detail. Release switch 140 of locking mechanism 120 has a distal end 242 and a proximal end 244.

In one embodiment, shown in FIG. 2, back plate 124 of locking mechanism 120 has a first portion 226 and a second portion 228 which are permanently attached to one another by gluing, cementing or other similar means. In alternate embodiments, back plate 124 could be made of a unitary construction or of several pieces.

Locking mechanism 120 includes a lock 222 located between face plate 130 and back plate 124. In the embodiment shown in FIG. 2, lock 222 is a tumbler lock. However lock 222 could also be a key lock, combination lock, keypad lock, magnetic lock, electronic lock, or any other similar lock as would be apparent to one skilled in the relevant art. Lock 222 can be in a locked or unlocked position. In the embodiment shown in FIG. 2, lock 222 has a hollow core. Distal end 242 of release switch 140 slides through the hollow core of lock 222. Distal end 242 of release switch 140 cannot slide through the hollow core of lock 222 unless lock 222 is in an unlocked position.

FIG. 2 further shows a buckle engagement clip 232 and a catch engagement clip 234 located between back plate 124 and face plate 130 of locking mechanism 120. In the embodiment shown in FIG. 2, buckle 108 engages buckle engagement clip 232, thereby attaching second end 106 of collar 102 to locking mechanism 120. Catch 116 engages catch engagement clip 234, attaching second end 114 of leash 110 to locking mechanism 120. Although buckle 108, buckle engagement clip 232, catch 116, and catch engagement clip 234 are shown, similar engaging mechanisms could be used, as would be apparent to one skilled in the relevant art.

As shown in FIG. 2, the collar and leash assembly 100 includes an attachment means 260. Attachment means 260 secures face plate 130, first end 112 of leash 110, and first end 104 of collar 102, to back plate 124. Attachment means 260 is shown in FIG. 2 as a screw, however, it could also be a rivet, nail, adhesive, locking mechanism, or any similar attachment means as would be apparent to one skilled in the relevant art. As discussed above, the inner band of collar 102 has several sizing holes to adjust the size of collar 102.

Figure 3:
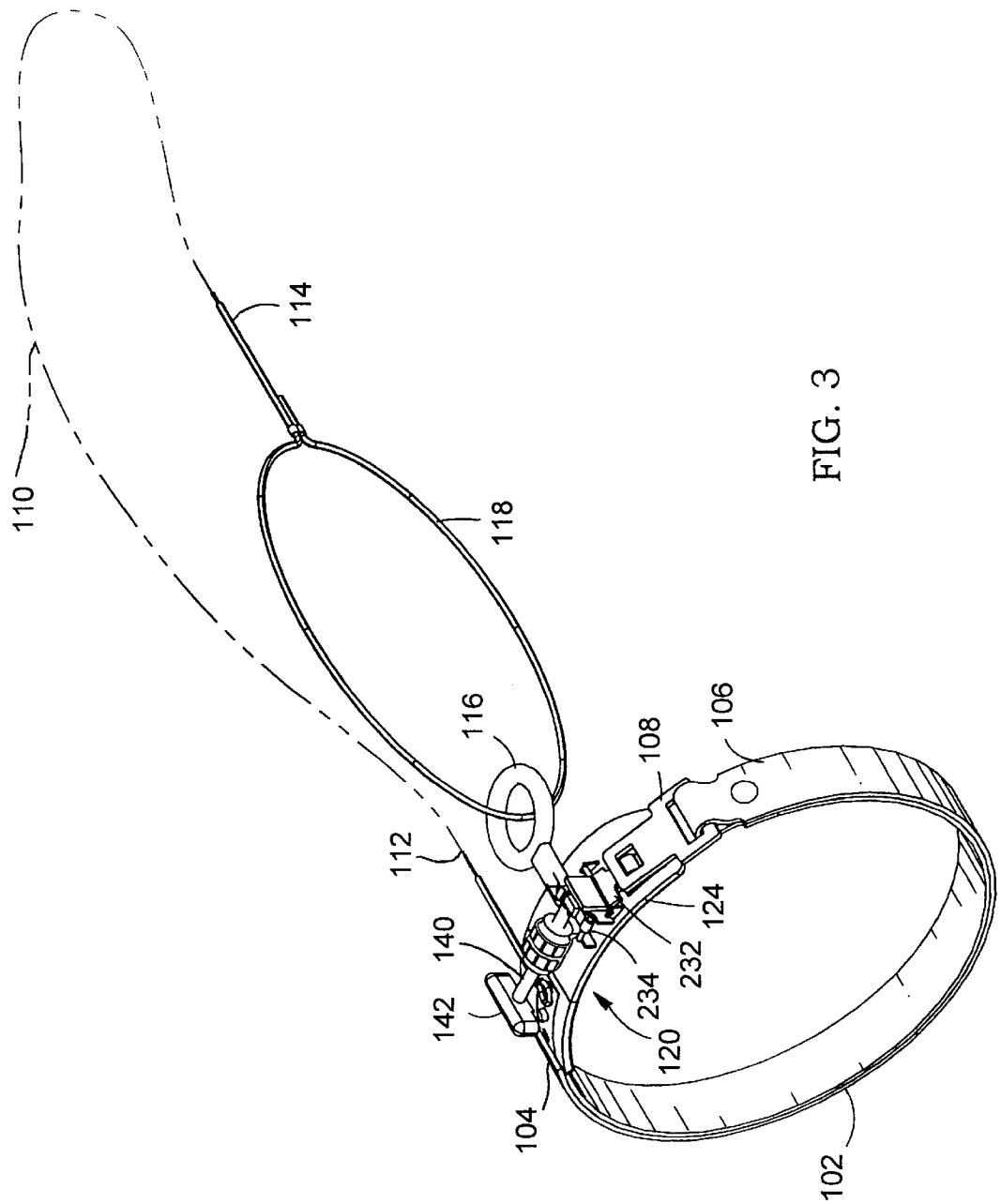
FIG. 3 is a perspective view of the collar and leash assembly shown with the face plate of FIG. 1 removed.

The perspective view of FIG. 3 shows locking mechanism 120 with face plate 130 removed. As described above, buckle 108 engages buckle engagement clip 232, thereby attaching second end 106 of collar 102 to locking mechanism 120. In particular, in the embodiment shown, a protrusion on buckle engagement clip 232 engages a corresponding hole in buckle 108. Catch 116 engages catch engagement clip 234, thereby attaching second end 114 of leash 110 to locking mechanism 120. Similarly, a protrusion on catch engagement clip 234 engages a corresponding hole in catch 116.

Figure 4:
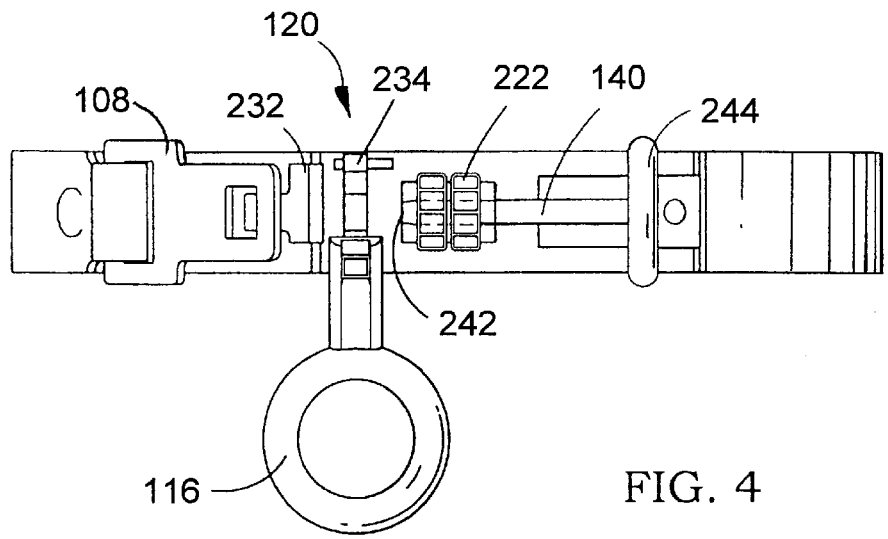
FIG. 4 is a top view of the locking mechanism of FIG. 1 shown with the face plate removed, and showing the release switch in a first position.
Figure 5:
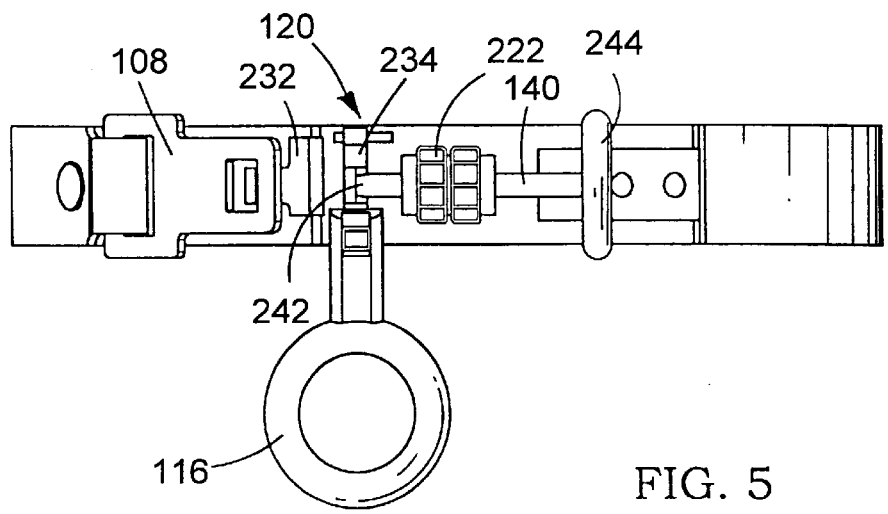
FIG. 5 is a top view of the locking mechanism of FIG. 1 shown with the face plate removed, and showing the release switch in a second position.
Figure 6:
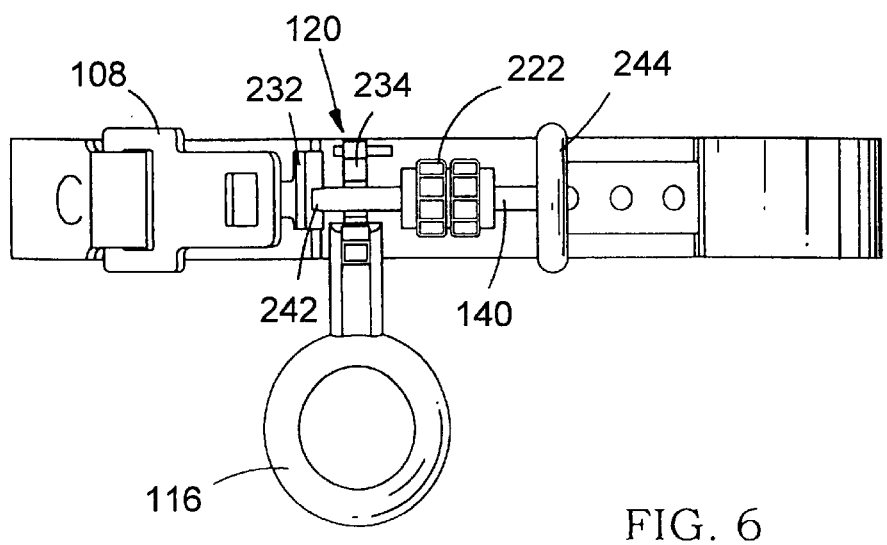
FIG. 6 is a top view of the locking mechanism of FIG. 1 shown with the face plate removed, and showing the release switch in a third position.

FIGS. 4, 5 and 6 are top views of locking mechanism 120 shown with face plate 130 removed. Release switch 140 is shown in its three different positions. For example, release switch 140 is shown in a first position in FIG. 4. In the first position, distal end 242 is flush with the end of lock 222. Release switch 140 cannot move from the first position while lock 222 remains locked. When lock 222 is unlocked, release switch 140 is free to slide into the second or third positions, as shown in FIGS. 5 and 6. In one embodiment, release switch 140 is spring loaded so that it always returns to the first position when lock 222 is in its unlocked position.

FIG. 5 shows release switch 140 occupying the second position. To move release switch 140 from the first position to the second position, lock 222 must be unlocked. When lock 222 is unlocked, release switch 140 can occupy the second position by sliding release switch 140 in the distal direction towards catch engagement clip 234. As distal end 242 approaches the second position, it engages catch engagement clip 234, thereby forcing it downward. This downward force disengages the protrusion of catch engagement clip 234 from the hole in catch 116 to release second end 114 of leash 110 from locking mechanism 120. In one embodiment, locking mechanism 120 is spring loaded so that catch 116 easily disengages to release second end 114 of leash 110 when release switch 140 occupies the second position.

FIG. 6 shows release switch 140 occupying the third position. To move release switch 140 to the third position, lock 222 must be unlocked. When lock 222 is unlocked, release switch 140 can occupy the third position by sliding release switch 140 in the distal direction, past the second position, and towards buckle engagement clip 232. When distal end 242 approaches the third position, it engages buckle engagement clip 232, thereby forcing it downward. This downward force disengages the protrusion of buckle engagement clip 232 from the hole in buckle 108 to release second end 106 of collar 102 from locking mechanism 120. In one embodiment, locking mechanism 120 is spring loaded so that buckle is easily disengaged to release second end 106 of collar 102 when release switch 140 occupies the third position.

Figure 7:
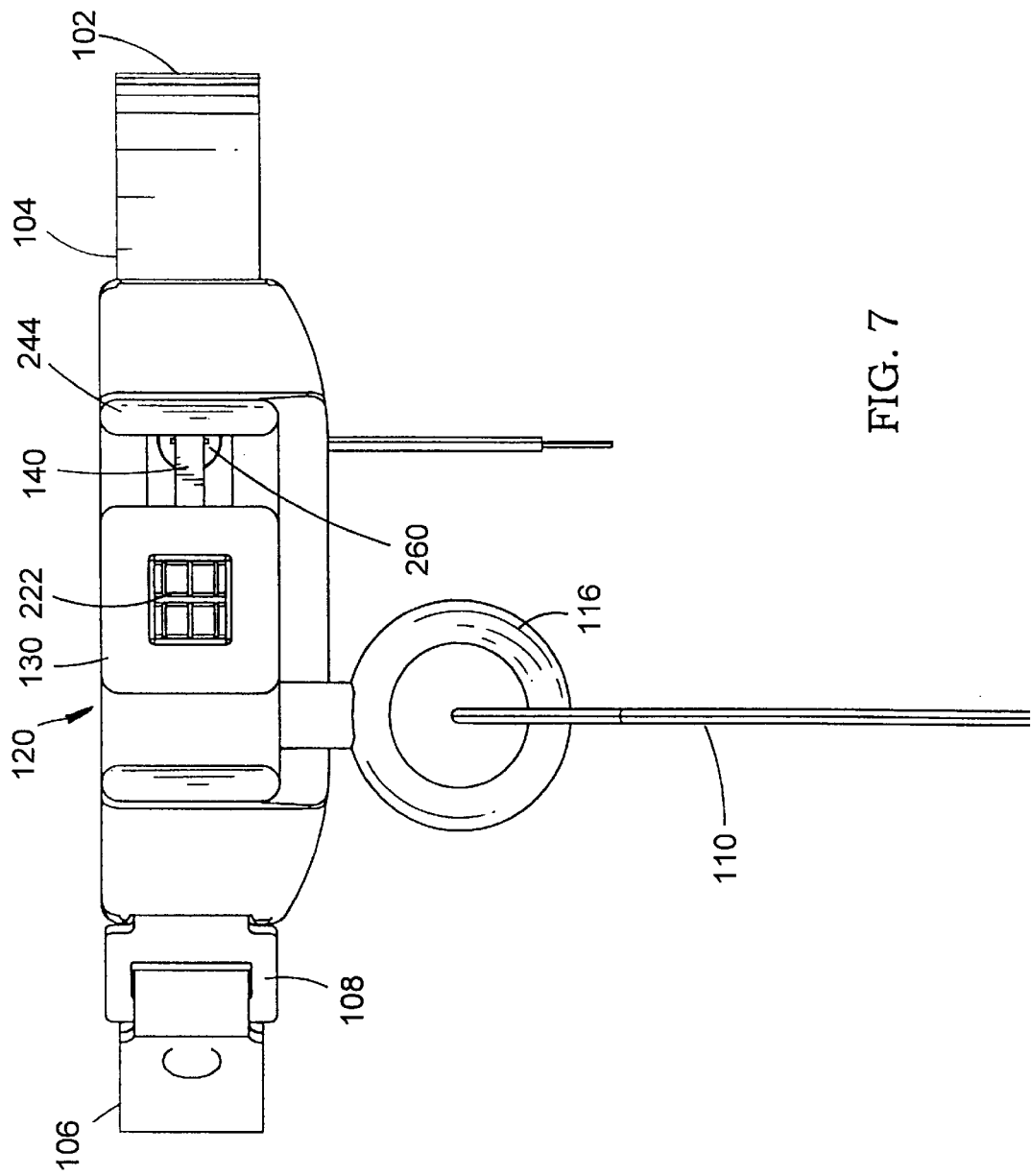
FIG. 7 is a top view of the locking mechanism of FIG. 1.

Referring now to FIG. 7, a top view of locking mechanism 120 is shown with face plate 130 attached. Attachment means 260 is shown beneath proximal end 244 of release switch 140. In this embodiment, attachment means 260 cannot be accessed when release switch 140 is in the first position.

Figure 8:
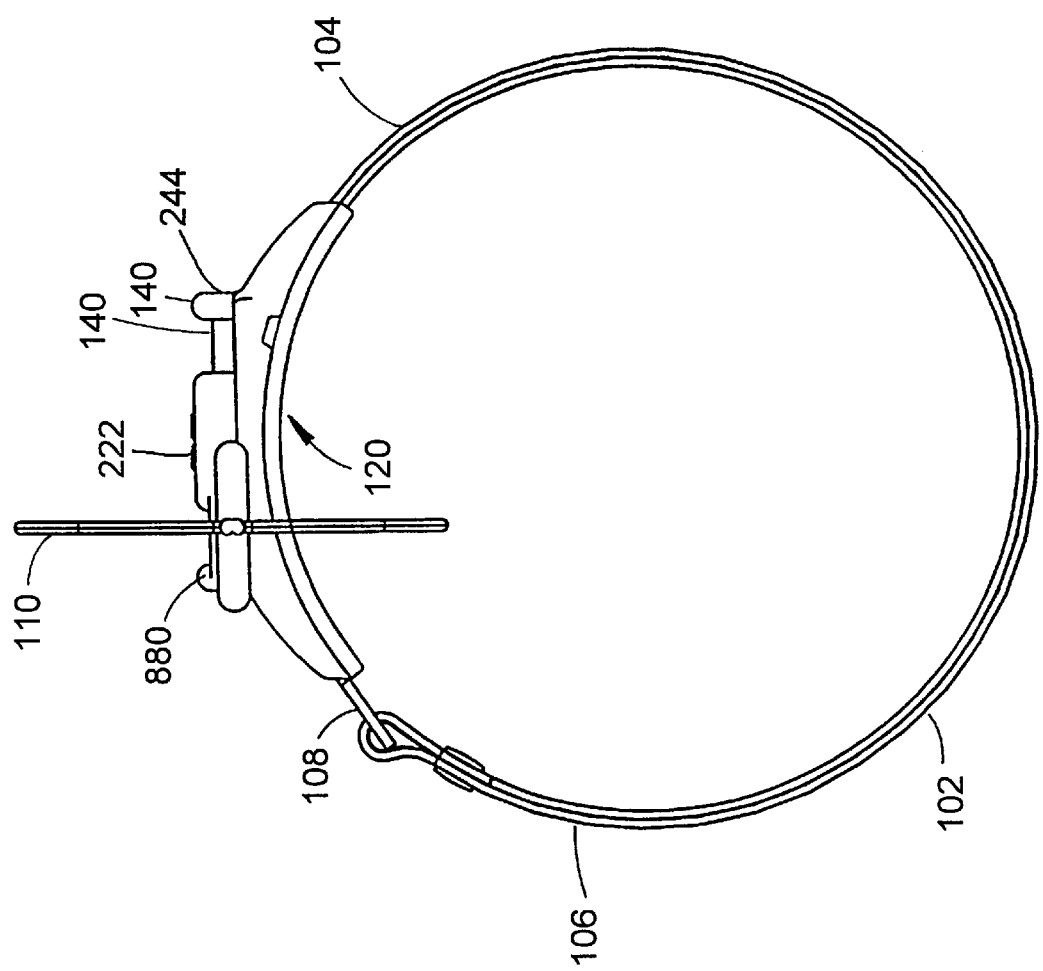
FIG. 8 is a side view of the collar and leash assembly of FIG. 1.

FIG. 8 shows a side view of collar and leash assembly 100. In one embodiment, locking mechanism 120 has an elevated ridge 880 located on one side of lock 222. Elevated ridge 880 and proximal end 244 of release switch 140 extend upward, even with or beyond the top surface of the lock, to provide physical protection on either side to lock 222 when locking mechanism 120 comes into contact with the ground or any other potentially damaging surface.

In one embodiment shown in FIG. 8, elevated ridge 880 is located on the opposite side of lock 222 from proximal end 244 of release switch 140. Although elevated ridge 880 and proximal end 244 are shown on opposite sides of lock 222, various numbers, shapes, and sizes of elevated ridges or other protection means could be used in various positions to provide physical protection to lock 222, as would be apparent to one skilled in the relevant art.

In use, a user attaches the collar to a pet by sliding the release switch to the third position while the lock is in its unlocked condition. The distal end will thus disengage the buckle from the locking mechanism. Once the collar has been placed around the animal's neck, the buckle is inserted into the locking mechanism and the release switch is allowed to return to its resting position, i.e., the first position. The user then places the lock in its locked position.

To secure the animal about a secure object, such as for example a chain link fence, the user places the lock in its unlocked position and slides the release switch to its second position. This allows the user to insert the catch into the locking mechanism. The user then allows the release switch to return to the first position so that the catch engagement clip engages the catch, thereby securing the second end of the leash to the locking mechanism. The user then places the lock in its locked position. To unlock the leash, the user merely unlocks the lock, slides the release switch to its second position and disengages the catch from the locking mechanism.

While the invention has been particularly shown and described with reference to preferred embodiments thereof, it will be understood by those skilled in the art that various changes in form and details may be made therein without departing from the spirit and scope of the invention.

What is claimed is:

1. A collar and leash assembly comprising:
    a collar having first end and a second end;
    a leash having a first end and a second end, wherein said first end of said leash is attached to said first end of said collar;
    a catch disposed on said second end of said leash;
    a buckle disposed on said second end of said collar; and
    a locking mechanism having a lock disposed therein, wherein said locking mechanism is attached to said first end of said leash and said first end of said collar, and wherein said lock has a hollow core and is capable of being in a locked position or an unlocked position, said locking mechanism including;
    a back plate,
    a face plate, wherein said first end of said collar and said first end of said leash are disposed between said back plate and said face plate,
    a buckle engagement clip configured to engage said buckle,
    a catch engagement clip configured to engage said catch, and
    a release switch having a distal end and a proximal end, said release switch being capable of sliding through said hollow core of said lock when said lock is in said unlocked position.

2. The collar and leash assembly of claim 1, wherein said distal end of said release switch engages said catch engagement clip when said lock is in said unlocked position, whereby engagement of said release switch with said catch engagement clip releases said catch from said catch engagement clip.

3. The collar and leash assembly of claim 1, wherein said distal end of said release switch engages said buckle engagement clip when said lock is in said unlocked position, whereby engagement of said release switch with said buckle engagement clip releases said buckle from said buckle engagement clip.

4. The collar and leash assembly of claim 1, wherein said release switch slides between a first position, a second position, and a third position.

5. The collar and leash assembly of claim 4, wherein said distal end of said release switch engages said catch engagement clip when said release switch is in said second position, whereby engagement of said release switch with said catch engagement clip releases said catch from said catch engagement clip.

6. The collar and leash assembly of claim 4, wherein said distal end of said release switch engages said buckle engagement clip when said release switch is in said third position, wherein engagement of said release switch with said buckle engagement clip releases said buckle from said buckle engagement clip.

7. The collar and leash assembly of claim 1, further comprising a handle disposed on said second end of said leash, wherein said catch is disposed on said handle.

8. The collar and leash assembly of claim 1, further comprising:
    attachment means for attaching said back plate and said face plate of said locking mechanism to said first end of said collar.

9. The collar and leash assembly of claim 8, wherein said attachment means can only be accessed when said lock is in said unlocked position.

10. The collar and leash assembly of claim 1, wherein said face plate includes one or more elevated ridges configured to protect said lock.

11. The collar and leash assembly of claim 1, wherein said lock is selected from the group consisting of one or more of the following: tumbler lock, key lock, keypad lock, magnetic lock, electronic lock, and combination lock.

12. The collar and leash assembly of claim 1, wherein said leash is a stainless steel cable covered with leather.

13. The collar and leash assembly of claim 1, wherein said leash is a stainless steel cable covered with nylon.

14. The collar and leash assembly of claim 1, wherein said collar is a steel band covered with leather.

15. The collar and leash assembly of claim 1, wherein said collar is a steel band covered with nylon.

* * * * *